United States Patent
Nguyen et al.

(10) Patent No.: US 10,374,455 B2
(45) Date of Patent: Aug. 6, 2019

(54) UNINTERRUPTIBLE POWER SUPPLY INCLUDING BATTERY MODULES CONNECTED DIRECTLY TO DIRECT CURRENT-ALTERNATING CURRENT INVERTER

(71) Applicant: Hewlett Packard Enterprise Development LP, Houston, TX (US)

(72) Inventors: Hai Ngoc Nguyen, Houston, TX (US); Abhishek Banerjee, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 180 days.

(21) Appl. No.: 15/142,481

(22) Filed: Apr. 29, 2016

(65) Prior Publication Data
US 2017/0317527 A1    Nov. 2, 2017

(51) Int. Cl.
*H02J 9/06* (2006.01)

(52) U.S. Cl.
CPC .................... *H02J 9/062* (2013.01)

(58) Field of Classification Search
None
See application file for complete search history.

(56) References Cited

U.S. PATENT DOCUMENTS

| | | | |
|---|---|---|---|
| 4,246,633 A * | 1/1981 | Borkovitz | H02J 9/062 307/66 |
| 4,673,826 A * | 6/1987 | Masson | H02J 7/0026 307/64 |
| 6,738,276 B2 | 5/2004 | Yu | |
| 8,053,927 B2 | 11/2011 | Hjort et al. | |
| 8,362,647 B2 | 1/2013 | Anderson et al. | |
| 2004/0196005 A1 * | 10/2004 | Okui | H02J 7/027 320/132 |
| 2005/0225914 A1 * | 10/2005 | King | H02J 7/34 361/62 |
| 2012/0313437 A1 * | 12/2012 | Latham | H02J 1/102 307/65 |
| 2012/0319653 A1 * | 12/2012 | Kumar | H02J 7/0013 320/118 |
| 2013/0271083 A1 * | 10/2013 | Williams | H02J 3/28 320/128 |
| 2013/0278216 A1 * | 10/2013 | Son | H02J 9/062 320/112 |

(Continued)

OTHER PUBLICATIONS

Joos, G. et al., "An online UPS with improved input-output characteristics", (Research Paper), Feb. 23-27, 1992, pp. 298-605.

*Primary Examiner* — Rexford N Barnie
*Assistant Examiner* — David A Shiao
(74) *Attorney, Agent, or Firm* — Tong, Rea, Bentley & Kim, LLC

(57) ABSTRACT

In an example, an apparatus includes a charger for rectifying a direct current charge from an input alternating current voltage. A battery pack stores the direct current charge in a first string of battery modules and a second string of battery modules. An inverter is connected directly to the battery pack and inverts the direct current voltage to an output alternating current voltage. In one example, the first string of battery modules is directly connected to the inverter in parallel with the second string of battery modules.

20 Claims, 5 Drawing Sheets

(56) References Cited

U.S. PATENT DOCUMENTS

| | | | |
|---|---|---|---|
| 2014/0152100 A1* | 6/2014 | Lim | H02J 7/0026 |
| | | | 307/23 |
| 2015/0008745 A1 | 1/2015 | Navarro | |
| 2015/0311750 A1* | 10/2015 | Hui Jung | H02J 9/062 |
| | | | 307/66 |
| 2016/0061874 A1* | 3/2016 | Nakai | G01R 31/3679 |
| | | | 324/426 |
| 2017/0033596 A1* | 2/2017 | Brooks | H02J 9/061 |

* cited by examiner

UNINTERRUPTIBLE POWER SUPPLY INCLUDING BATTERY MODULES CONNECTED DIRECTLY TO DIRECT CURRENT-ALTERNATING CURRENT INVERTER

BACKGROUND

An uninterruptible power supply (UPS) is an apparatus that provides a supply of back-up power in the event of a loss of utility, for the purposes of protecting the load supported by the utility. The load may include an individual computer, a server in a datacenter, or another load depending on application. The supply of back-up power is at least enough to start a standby power source, such as a generator or an alternate utility line, or to properly shut down the load. This supply of back-up power is stored by the UPS in batteries, supercapacitors, or flywheels.

DETAILED DESCRIPTION

The present disclosure broadly describes an offline alternating current (AC) uninterruptible power supply (UPS) including battery modules that are connected directly to a direct current-alternating current (DC-AC) inverter. When the input voltage to a protected hardware is within a predefined operating threshold, the protected hardware will draw power from the input power source through the UPS, while an internal charger of the offline UPS charges an internal battery module. When the input voltage falls below or rises above the threshold, an offline UPS will activate its internal DC-AC inverter circuitry, which is powered by an internal battery module. The UPS will then enable the output semiconductor switch to connect the hardware to its DC-AC inverter output.

Examples of the present disclosure provide an offline alternating current (AC) uninterruptable power supply (UPS) including two battery strings connected directly to a direct current-alternating current (DC-AC) inverter. In one example, each of the two battery strings includes four battery modules connected in series. For a low-line voltage, single-phase 3 kVA UPS, the battery strings connect to the DC-AC inverter in parallel to produce 172-224 volts of direct current (Vdc) through the battery modules and 115 volts of alternating current (Vac) through the inverter. For a high-line voltage, 6 kVA UPS, the battery strings connect to the DC-AC converter in series to produce 344-448 Vdc through the battery modules and 230 Vac through the inverter. Thus, the battery strings provide the necessary DC voltage to the inverter without the use of an intermediate DC-DC converter to boost the DC voltage produced by the battery strings.

Figure 1:
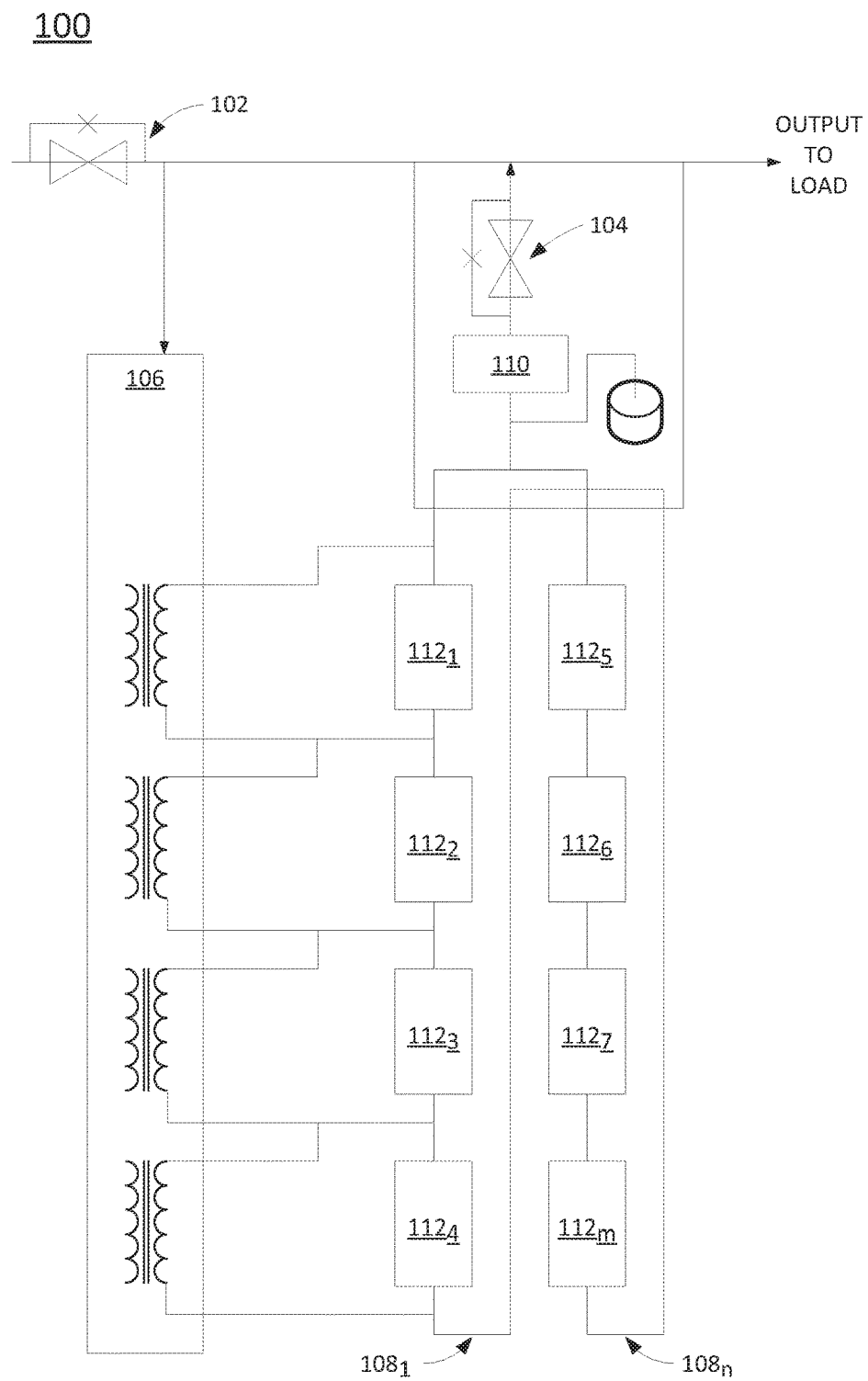
FIG. 1 is a high-level block diagram of a first example of an alternating current uninterruptible power supply of the present disclosure.

FIG. 1 is a high-level block diagram of a first example of an alternating current (AC) uninterruptible power supply (UPS) 100 of the present disclosure. The example UPS 100 is configured for a low line voltage (e.g., 115 Vac) power system, such as that used in North America. In one example, the UPS 100 includes an input semiconductor switch 102, an output semiconductor switch 104, a charger 106, a plurality of battery strings $108_1$-$108_n$ (hereinafter collectively referred to as "battery strings 108"), and an inverter 110.

In one example the input semiconductor switch 102 is configured to draw an AC input from a power source (e.g., mains electric power) and to provide the AC input to the charger 106.

In one example, the charger 106 is a one kilowatt (kW) alternating current/direct current multiple isolated output charger. The charger 106 is configured to rectify the AC input to a DC voltage that charges the battery strings 108.

Each of the battery strings 108 comprises a plurality of battery modules $112_1$-$112_m$ (hereinafter collectively referred to as "battery modules 112") connected in series, where each battery module 112 may, in turn, house a plurality of individual rechargeable batteries. Collectively, the battery strings 108 may be referred to as a battery pack. The battery modules 112 draw a charge from the DC voltage provided by the charger 106 when the UPS 100 is in charging mode (i.e., not providing emergency power to protected hardware). In the illustrated example, two battery strings 108 each comprise four battery modules 112 connected in series, for a total of eight battery modules 112 (although more or fewer battery modules 112 could be used). Also in the illustrated example, the battery strings 108 are connected in parallel to the inverter 110, such that the DC voltage across each of the battery strings 108 is the same, and the total direct current provided to the inverter 110 is the sum of the direct currents through each battery string 108. In one example, this arrangement allows the battery strings 108 to provide between 172 and 224 volts of direct current (Vdc) to the inverter 110.

In one example, the inverter 110 is a 115 Vac 3 kVA direct current/alternating current inverter that is able to accept variable DC input (e.g., in the range of 172-224 Vdc) from the battery strings 108. The inverter 110 inverts the incoming DC voltage from the battery strings 108 back to an AC voltage (in this example, 115 Vac) sufficient to power the protected hardware in the event of an interruption to the mains electric power.

The output semiconductor switch 104 draws the AC voltage (e.g., 115 Vac in the above example) from the inverter 110 and provides it to an external device, such as the protected hardware.

In operation, the UPS 100 is connected to the protected hardware, which, under a normal range of incoming voltage conditions, will draw its power directly from the mains electric power. During this time, the UPS 100 is also connected to the mains electric power, but operates in a standby mode in which the mains electric power is used to charge the battery modules 112 and power conducts directly from the input semiconductor switch 102 to the output to load. When the incoming voltage to the protected hardware and to the UPS 100 falls below or rises above a predetermined threshold, inverter 110 is activated and begins to draw stored DC voltage from the battery modules 112. The inverter 100 inverts the stored DC voltage (e.g., in the range of 172 to 224 Vdc) to an AC voltage (e.g., 115 Vac). The UPS 100 will then enable the output semiconductor switch 104 to connect the protected hardware to its DC-AC inverter output, so that power conducts from the input semiconductor switch 102 through the inverter 110 and the output semiconductor switch 104. Thus, the protected hardware will begin to temporarily draw its power directly from the UPS 100.

Figure 2:
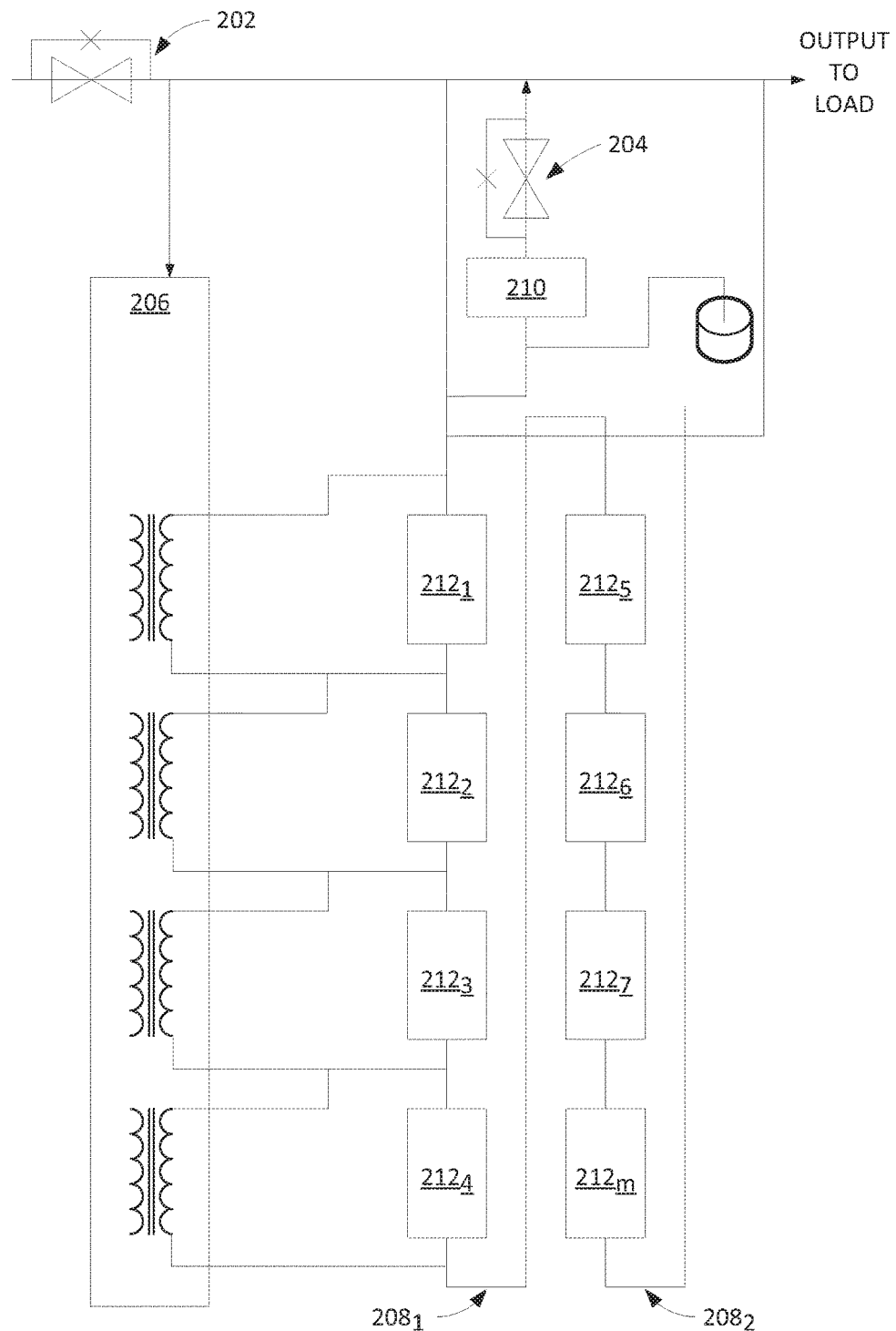
FIG. 2 is a high-level block diagram of a second example of an alternating current uninterruptible power supply of the present disclosure.

FIG. 2 is a high-level block diagram of a second example of an alternating current (AC) uninterruptible power supply (UPS) 200 of the present disclosure. The example UPS 200 is configured for a high line voltage (e.g., 230 Vac) power system, such as that used in Europe and Australia. In one example, the UPS 200 includes an input semiconductor switch 202, an output semiconductor switch 204, a charger 206, a plurality of battery strings 208$_1$-208$_n$ (hereinafter collectively referred to as "battery strings 208"), and an inverter 210.

In one example the input semiconductor switch 202 is configured to draw an AC input from a power source (e.g., mains electric power) and to provide the AC input to the charger 206.

In one example, the charger 206 is a one kilowatt (kW) alternating current/direct current multiple isolated output charger. The charger 206 is configured to rectify the AC input to a DC voltage that charges the battery strings 208.

Each of the battery strings 208 comprises a plurality of battery modules 212$_1$-212$_m$ (hereinafter collectively referred to as "batteries 212") connected in series, where each battery module 212 may, in turn, house a plurality of individual rechargeable batteries. Collectively, the battery strings 108 may be referred to as a battery pack. The battery modules 212 draw a charge from the DC voltage provided by the charger 206 when the UPS 200 is in charging mode (i.e., not providing emergency power to protected hardware). In the illustrated example, two battery strings 208 each comprise four battery modules 212 connected in series, for a total of eight battery modules 212 (although more or fewer battery modules 212 could be used). However, unlike the battery strings 108 of the UPS 100, which connect to the inverter 110 in parallel, the battery strings 208 are connected in series to the inverter 210, such that the current through each of the battery strings 208 is the same, and the DC voltage across the combination of the two battery strings 208 is the sum of the DC voltages across each individual battery string 208. In one example, this arrangement allows the battery strings 208 to provide between 344 and 448 volts of direct current (Vdc) to the inverter 210.

In one example, the inverter 210 is a 230 Vac 6 kVA direct current/alternating current inverter that is able to accept variable DC input (e.g., in the range of 344-448 Vdc) from the battery strings 208. The inverter 210 inverts the incoming DC voltage from the battery strings 208 back to an AC voltage (in this example, 230 Vac) sufficient to power the protected hardware in the event of an interruption to the mains electric power.

The output semiconductor switch 204 draws the AC voltage (e.g., 230 Vac in the above example) from the inverter 210 and provides it to an external device, such as the protected hardware.

In operation, the UPS 200 is connected to the protected hardware, which, under a normal range of incoming voltage conditions, will draw its power directly from the mains electric power. During this time, the UPS 200 is also connected to the mains electric power, but operates in a standby mode in which the mains electric power is used to charge the battery modules 212 and power conducts directly from the input semiconductor switch 202 to the output to load. When the incoming voltage to the protected hardware and to the UPS 200 falls below or rises above a predetermined threshold, inverter 210 is activated and begins to draw stored DC voltage from the batteries 212. The inverter 200 inverts the stored DC voltage (e.g., in the range of 344 to 448 Vdc) to an AC voltage (e.g., 230 Vac). The UPS 200 will then enable the output semiconductor switch 204 to connect the protected hardware to its DC-AC inverter output, so that power conducts from the input semiconductor switch 202 through the inverter 210 and the output semiconductor switch 204. Thus, the protected hardware will begin to temporarily draw its power directly from the UPS 200.

Thus, both the UPS 100 and the UPS 200 are able to provide at least the minimum DC voltage used by the respective inverters 110 and 210 to generate the appropriate AC voltage for the respective power systems (e.g., low-line or high-line), without the use of a DC-DC converter to boost the DC voltage. For instance, the minimum DC voltage Min$_{DC}$ to produce a desired AC voltage Vac can be expressed as:

$$\text{Min}_{DC}=[\text{Vac}*\sqrt{2}*1.1]/\text{Fil} \quad \text{(EQN. 1)}$$

where Filt is the voltage that may be lost due to a drop across the filters in the circuit. To compensate for this lost voltage, the product of Vac and the square root of two is multiplied by a factor of 1.1 (e.g., ten percent). Thus, EQN. 1 can also be written simply as:

$$\text{Min}_{DC}=[\text{Vac}*\sqrt{2}] \quad \text{(EQN. 2)}$$

Thus, it can be seen from EQNs. 1 and 2 that the minimum DC voltage to produce 115 Vac is 162.61 Vdc (i.e., 115*$\sqrt{2}$), which is satisfied by the range of 172-224 Vdc produced by the parallel-connected battery strings 108 of the UPS 100. Similarly, the minimum DC voltage to produce 230 Vac is 325.22 Vdc (i.e., 230*$\sqrt{2}$), which is satisfied by the range of 344-448 Vdc produced by the series-connected battery strings 208 of the UPS 200.

This simplified configuration therefore eliminates at least one level of conversion, which reduces the costs to manufacture the UPS 100 or 200. In addition, the reliability and efficiency of the UPS 100 and 200 are improved, since they contain fewer power-consuming components to maintain.

In one example, the inverters 110 and 210 of the UPS 100 and the UPS 200 are controlled by a controller implementing an input DC voltage feedforward function. The controller may be implemented, for example, in the inverter 110 or 210.

Figure 3:
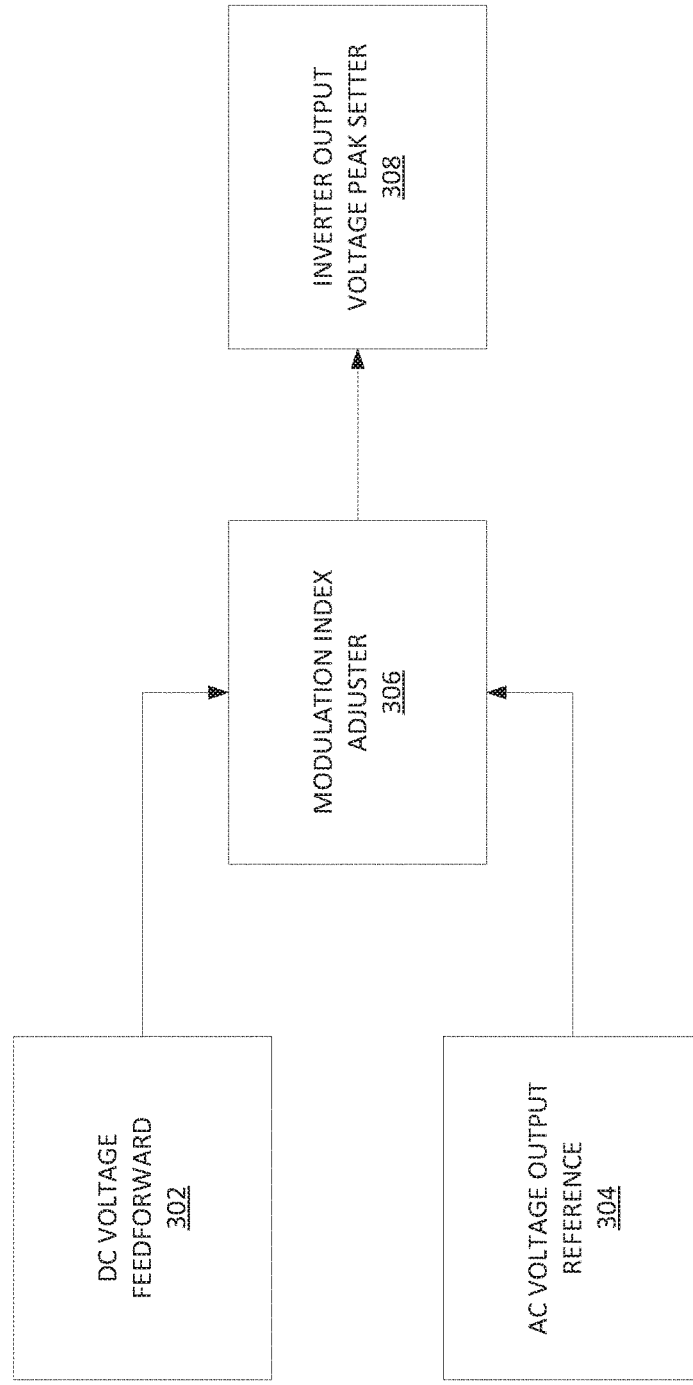
FIG. 3 is a high-level block diagram illustrating one example of a controller that may be used to control the inverters of FIGS. 1 and 2.

FIG. 3, for instance, is a high-level block diagram illustrating one example of a controller 300 that may be used to control the inverters 110 and 210 of FIGS. 1 and 2. The controller 300 may be implemented in a computer, such as the computer 600 illustrated in FIG. 6, that can be transformed into a machine capable of performing the functions described herein. As illustrated, the controller 300 includes a DC voltage feedforward function 302, an AC voltage output reference 304, a modulation index adjuster 306, and an inverter output voltage peak setter 308.

The DC voltage feedforward function 302 is a dynamic function that changes with the health/charge of the battery strings. It determines, based on the health of the batteries, what DC voltage is available to the inverter.

The AC voltage output reference 304 is a function of the region and application in which the UPS will be deployed (e.g., North America versus Europe, 3 kVA versus 6 kVA).

The AC voltage output reference 304 determines the AC output voltage of the inverter (e.g., 115 Vac for 3 kVA or 230 Vac for 6 kVA).

The modulation index adjuster 306 receives the outputs of the DC voltage feedforward function 302 and the AC voltage output reference 304 and dynamically adjusts the modulation index of the inverter based on these outputs so that the appropriate output voltage is generated using the available DC voltage.

The inverter output voltage peak setter 308 sets the peak output voltage of the inverter to a steady AC voltage, in response to adjusted modulation index of the inverter.

Figure 4:
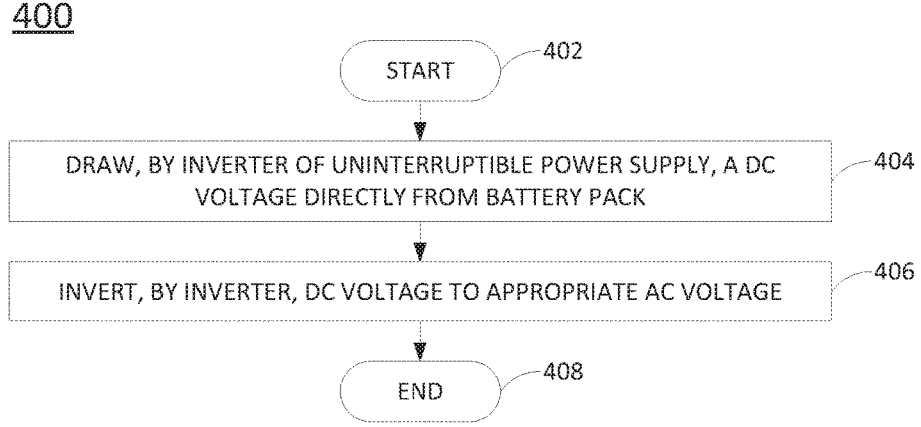
FIG. 4 illustrates a flowchart of a first example method for providing an uninterruptible power supply.

FIG. 4 illustrates a flowchart of a first example method 400 for providing an uninterruptible power supply. The method 400 may be implemented, for example, by an AC UPS device such as the UPS 100 of FIG. 1 or the UPS 200 of FIG. 2. More specifically, the method 400 may be implemented by a controller of a UPS that includes a DC feedforward function, such as the controller 300 illustrated in FIG. 3. In one example, the method 400 is invoked when the incoming voltage to the UPS falls below or rises above a predetermined threshold, i.e., when the UPS is operating in back-up mode.

The method 400 begins in block 402. In block 404, the inverter of the UPS draws a DC voltage directly from a battery pack or a set of rechargeable batteries, such as the battery strings 108 or 208 of FIGS. 1 and 2. In one example, the DC voltage is drawn by the inverter from the batteries directly, without the use of a DC-DC converter. For instance, in a 3 kVA UPS, the inverter may draw between 172 and 224 Vdc from two battery strings connected to the inverter in parallel. In a 6 kVA UPS, the inverter may draw between 344 and 448 Vdc from two battery strings connected to the inverter in series.

In block 406, the inverter inverts the DC voltage drawn directly from the batteries to an appropriate AC voltage. For instance, in a 3 kVA UPS, the inverter may invert a DC voltage of between 172 and 224 Vdc to an AC voltage of 115 Vac. In a 6 kVA UPS, the inverter may invert a DC voltage of between 344 and 448 Vdc to an AC voltage of 230 Vac.

The method 400 ends in block 408.

Figure 5:
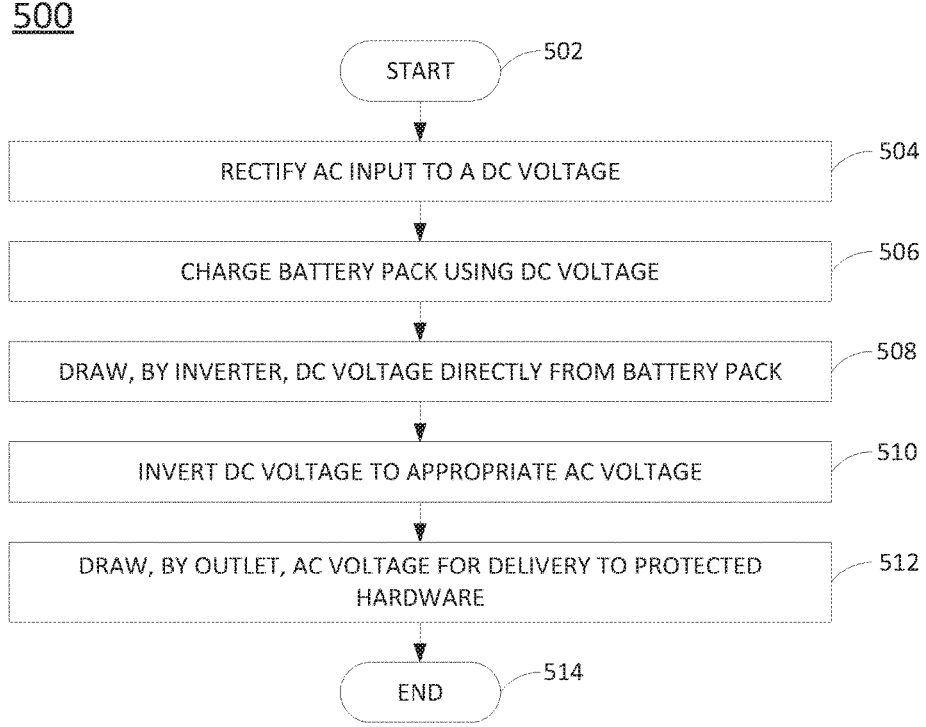
FIG. 5 illustrates a flowchart of a second example method for providing an uninterruptible power supply.

FIG. 5 illustrates a flowchart of a second example method 500 for providing an uninterruptible power supply. The method 500 is a more detailed version of the method 400 illustrated in FIG. 4. Thus, the method 500 may be implemented by an AC UPS device such as the UPS 100 of FIG. 1 or the UPS 200 of FIG. 2, and may be implemented in whole or in part by the controller 300 of FIG. 3. In one example, the method 500 includes both a charging and discharging stage, although charging and discharging of the UPS may be separately controlled by different algorithms.

The method 500 begins in block 502. In block 504, the charger of the UPS rectifies an AC input drawn from a power supply, such as mains electric power, to a DC voltage.

In block 506, the battery pack of the UPS draws a charge from the DC voltage provided by the charger. In one example, the battery pack comprises a plurality of battery modules arranged in a plurality of strings, where each of the strings comprises multiple battery modules connected in series. The individual strings may be connected in parallel or in series to the inverter of the UPS.

In block 508, the inverter of the UPS draws a DC voltage directly from the battery pack. In one example, the DC voltage is drawn by the inverter from the battery pack directly, without the use of a DC-DC converter. For instance, in a 3 kVA UPS, the inverter may draw between 172 and 224 Vdc from two battery strings connected to the inverter in parallel. In a 6 kVA UPS, the inverter may draw between 344 and 448 Vdc from two battery strings connected to the inverter in series.

In block 510, the inverter inverts the DC voltage drawn directly from the battery pack to an appropriate AC voltage. For instance, in a 3 kVA UPS, the inverter may invert a DC voltage of between 172 and 224 Vdc to an AC voltage of 115 Vac. In a 6 kVA UPS, the inverter may invert a DC voltage of between 344 and 448 Vdc to an AC voltage of 230 Vac.

In block 512, the outlet of the UPS draws the AC voltage from the inverter for delivery to an external device, such as protected hardware.

The method 500 ends in block 514.

Figure 6:
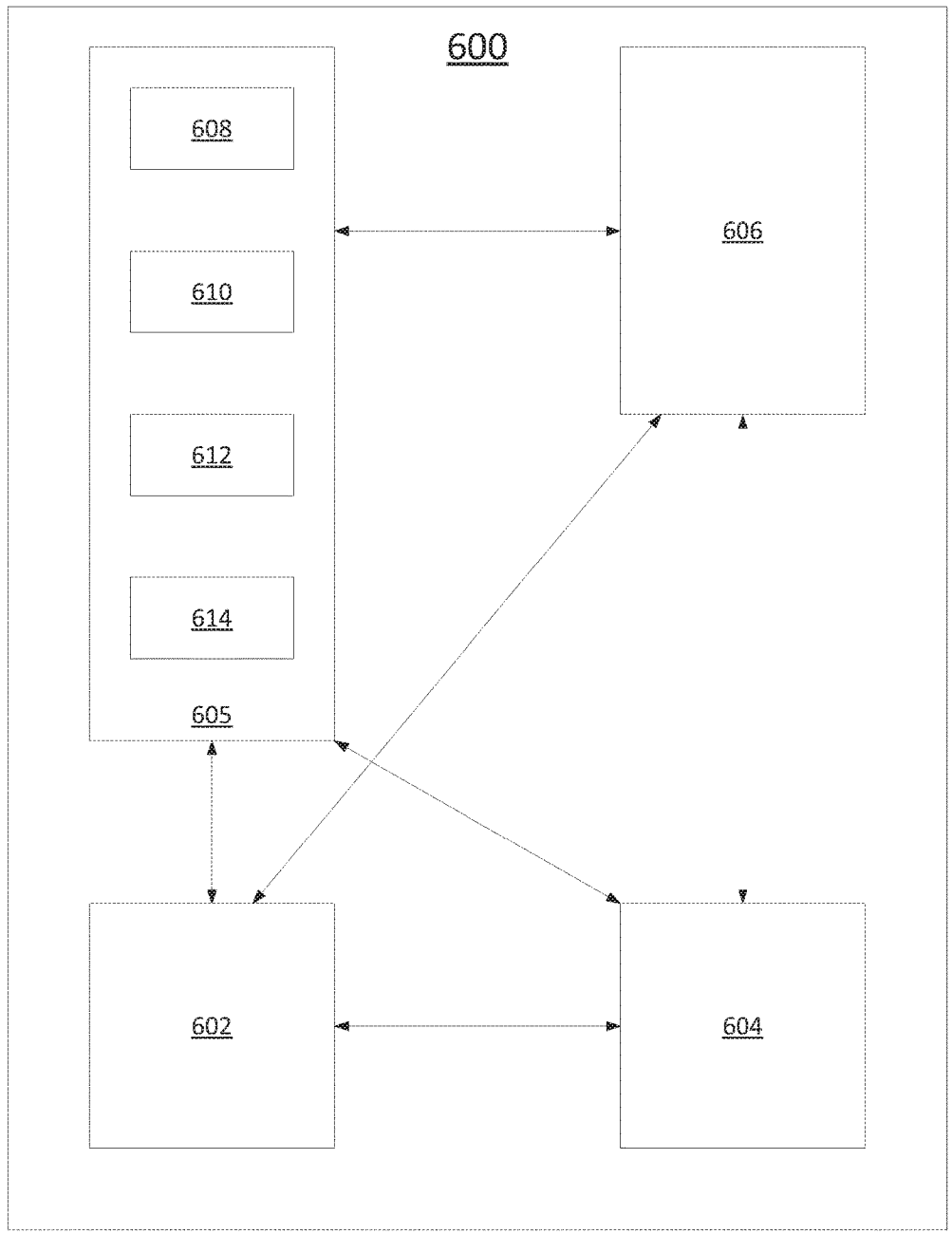
FIG. 6 depicts a high-level block diagram of an example computer that can be transformed into a machine capable of performing the functions described herein.

FIG. 6 depicts a high-level block diagram of an example computer 600 that can be transformed into a machine capable of performing the functions described herein. Notably, no computer or machine currently exists that performs the functions as described herein. As a result, the examples of the present disclosure modify the operation and functioning of the general-purpose computer to provide a cache manager-controlled memory array, as disclosed herein.

As depicted in FIG. 6, the computer 600 comprises a hardware processor element 602, e.g., a central processing unit (CPU), a microprocessor, or a multi-core processor, a memory 604, e.g., a temporary memory such as random access memory (RAM) and/or read only memory (ROM), an inverter module 605 for inverting a DC voltage to an AC voltage, and various input/output devices 606, e.g., storage devices, including but not limited to, a persistent memory array, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like.

Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 605 for converting a DC voltage to an AC voltage, e.g., machine readable instructions can be loaded into memory 604 and executed by hardware processor element 602 to implement the blocks, functions or operations as discussed above in connection with the methods 400 and 500. For instance, the module 605 may include a plurality of programming code components, including a DC feedforward component 608, an AC voltage reference component 610, a modulation index adjustment component 612, and/or an output voltage peak setter component 614.

The a DC feedforward component 608 may be configured to determine what DC voltage is available to the inverter, for example as discussed in connection with FIG. 3. The AC voltage reference component 610 may be configured to determine the AC output voltage of the inverter (e.g., 115 Vac for 3 kVA or 230 Vac for 6 kVA), for example as discussed in connection with FIG. 3. The modulation index adjustment component 612 may be configured to dynamically adjust the modulation index of the inverter, so that the appropriate output voltage is generated using the available DC voltage, for example as discussed in connection with FIG. 3. The output voltage peak setter component 614 may be configured to set the peak output voltage of the inverter to a steady AC voltage, for example as discussed in connection with FIG. 3.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for inverting a DC voltage to an AC voltage, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
   an uninterruptible power supply (UPS) including:
   a charger for rectifying an input alternating current (AC) voltage to generate a direct current (DC) charge;
   a battery pack comprising a first string of battery modules and a second string of battery modules for storing the DC charge;
   an inverter connected directly to the battery pack; and
   a controller comprising:
   a DC feedforward component configured to:
   determine a state of health of the battery pack; and
   determine, based on the state of health of the battery pack,
   an available amount of DC voltage to the inverter;
   a reference voltage component configured to provide a reference voltage; and
   a modulation index adjustment component configured to dynamically adjust a modulation index of the inverter, based on the available amount of DC voltage and based on the reference voltage, wherein an output AC voltage is generated by the inverter based on the dynamically adjusted modulation index of the inverter; and
   the UPS is coupled to a device that operates according to a predefined threshold corresponding to the input AC voltage wherein:
   the device draws power from the input AC voltage through the UPS while the input AC voltage is within the predefined threshold, and
   the UPS activates the inverter when the input AC voltage is outside of the predefined threshold.

2. The apparatus of claim 1, wherein the reference voltage corresponds to generating the output AC voltage of 115 volts for a 3 kVA uninterruptible power supply.

3. The apparatus of claim 1, wherein the first string of battery modules and the second string of battery module are in parallel, and wherein the available amount of DC voltage to the inverter is between 172 and 224 volts.

4. The apparatus of claim 3, wherein the output AC voltage is 115 volts.

5. The apparatus of claim 1, wherein the first string of battery modules and the second string of battery modules are connected in parallel with the inverter, wherein a DC voltage across the first string of battery modules is equal to a DC voltage across the second string of battery modules, and the available amount of DC voltage to the inverter is the DC voltage across the parallel first string of battery modules and the second string of battery modules.

6. The apparatus of claim 1, wherein the reference voltage corresponds to generating the output AC voltage of 230 volts for a 6 kVA uninterruptible power supply.

7. The apparatus of claim 1, wherein the first string of battery modules and the second string of battery module are in series, and wherein the available amount of DC voltage by the battery pack is between 344 and 448 volts.

8. The apparatus of claim 1, wherein the controller further comprises an output voltage peak setter component configured to adjust a peak voltage value of the output AC voltage based on the adjusted modulation index of the inverter and without a feedback from the output AC voltage.

9. An apparatus comprising:
   an uninterruptible power supply (UPS) including:
   a charger for rectifying an input alternating current (AC) voltage to generate a direct current (DC) charge;
   a battery pack comprising a first string of battery modules and a second string of battery modules for storing the DC charge;
   an inverter, connected directly to the battery pack, inverting the DC charge to an output AC voltage; and
   a controller comprising:
   a DC feedforward component configured to:
   determine a state of health of the battery pack; and
   determine, based on the state of health of the battery pack,
   an available amount of DC voltage to the inverter;
   a reference voltage component configured to provide a reference voltage; and
   a modulation index adjustment component configured to dynamically adjust a modulation index of the inverter, based on the available amount of DC voltage and based on the reference voltage, wherein the output AC voltage is generated by the inverter based on the dynamically adjusted modulation index of the inverter; and
   the apparatus is coupled to a device that operates according to a predefined threshold corresponding to the input AC voltage, wherein the device draws power from the input AC voltage through the UPS while the input AC voltage is within the predefined threshold, and wherein the UPS activates the inverter when the input AC voltage is outside of the predefined threshold.

10. The apparatus of claim 9, wherein the reference voltage corresponds to generating the output AC voltage of 230 volts for a 6 kVA uninterruptible power supply.

11. The apparatus of claim 9, wherein the first string of battery modules and the second string of battery module are in series, and wherein the available amount of DC voltage to the inverter is between 344 and 448 volts.

12. The apparatus of claim 11, wherein the output AC voltage is 230 volts.

13. The apparatus of claim 9, wherein the first string of battery modules and the second string of battery modules are connected in series with the inverter, wherein a DC voltage across the first string of battery modules is equal to a DC voltage across the second string of battery modules, and the available amount of DC voltage provided to the inverter is a sum of the DC voltage across the first string of battery modules and the DC voltage across the second string of battery modules.

14. The apparatus of claim 9, wherein the controller further comprises an output voltage peak setter component configured to adjust a peak voltage value of the output AC voltage based on the adjusted modulation index of the inverter and without a feedback from the output AC voltage.

15. A method comprising:
  operating an uninterruptible power supply (UPS) according to a predefined operating threshold corresponding to an input alternating current (AC) voltage,
  wherein a device draws power from the input AC voltage through the UPS while the input AC voltage is within a predefined threshold, wherein the UPS activates an inverter of the UPS when the input AC voltage is outside of the predefined threshold;
  drawing, by the inverter, a direct current (DC) voltage directly from a battery pack of the UPS, wherein the UPS comprises a controller that includes:
    a DC feedforward component configured to determine a state of health of the battery pack and determine, based on the state of health of the battery pack, an available amount of DC voltage to the inverter;
    a reference voltage component configured to provide a reference voltage; and
    a modulation index adjustment component configured to dynamically adjust a modulation index of the inverter, based on the available amount of DC voltage and based on the reference voltage; and
  generating, by the inverter, an output AC voltage based on the dynamically adjusted modulation index of the inverter.

16. The method of claim 15, wherein the UPS is a 3 kVA uninterruptible power supply with the output AC voltage of 115 volts, and wherein the battery pack comprises:
  a first string of battery modules; and
  a second string of battery modules, directly connected to the inverter in parallel with the first string of battery modules.

17. The method of claim 15, wherein the available amount of DC voltage to the inverter is between 172 and 224 volts, and the output AC voltage is 115 volts.

18. The method of claim 15, wherein the UPS is a 6 kVA uninterruptible power supply with the output AC voltage of 230 volts, and wherein the battery pack comprises:
  a first string of battery modules; and
  a second string of battery modules, directly connected to the inverter in series with the first string of battery modules.

19. The method of claim 15, wherein the available amount of DC voltage to the inverter is between 344 and 448 volts, and the output AC voltage is 230 volts.

20. The method of claim 15, wherein the controller further comprises an output voltage peak setter component, the method further comprising:
  adjusting
  a peak voltage value of the output AC voltage based, at least in part, on the adjusted modulation index of the inverter.

* * * * *